(12) United States Patent
Lord et al.

(10) Patent No.: US 7,470,860 B2
(45) Date of Patent: Dec. 30, 2008

(54) BUS BAR MOUNTING ARRANGEMENT

(75) Inventors: Normand Lord, Lac Beauport (CA); Daniel Gaboury, St-Augustin-de-desma (CA); Sebastien Arcand, St-Augustin-de-desma (CA); Marc-André Lajoie, Ste-Foy (CA)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 11/558,077

(22) Filed: Nov. 9, 2006

(65) Prior Publication Data

US 2007/0102184 A1 May 10, 2007

(30) Foreign Application Priority Data

Nov. 10, 2005 (CA) .................................. 2526728

(51) Int. Cl.
*H01R 4/00* (2006.01)
(52) U.S. Cl. .................................................. 174/88 B
(58) Field of Classification Search ............... 174/88 B, 174/70 B, 99 B, 149 B
See application file for complete search history.

(56) References Cited

U.S. PATENT DOCUMENTS 3,175,262 A   3/1965  Wilson
3,315,132 A * 4/1967  Lucas .......................... 361/829
3,804,970 A * 4/1974  Oldman ...................... 174/16.2
5,828,006 A * 10/1998 Graham et al. ............. 174/99 R

FOREIGN PATENT DOCUMENTS

| CA | 684522     | 4/1964  |
|----|------------|---------|
| CH | 564830 A5  | 7/1975  |
| DE | 1440153 A1 | 3/1969  |
| EP | 1265332 A  | 12/2002 |
| GB | 1005259    | 9/1965  |

* cited by examiner

*Primary Examiner*—Chau N Nguyen
(74) *Attorney, Agent, or Firm*—GE Global Patent Operation

(57) ABSTRACT

A polyphase bus bar mounting structure mounted to a support structure is disclosed. The support structure may comprise any of a rack, wall or a segment of a wind turbine tower. The polyphase bus bar mounting structure has a plurality of cylindrical tubular conductors arranged substantially parallel to each other. Each of the tubular conductors has first and second opposing end portions adapted for connection with conductors of other polyphase bus bar mounting structures. Insulation surrounds each of the tubular conductor. The bus bar mounting structure has first and second connectors. The first connector fixedly mounts the cylindrical tubular conductors adjacent the first end portions thereof to the support structure. The second connector flexibly mounts the cylindrical tubular conductors adjacent the second end portions thereof to the support structure.

20 Claims, 4 Drawing Sheets

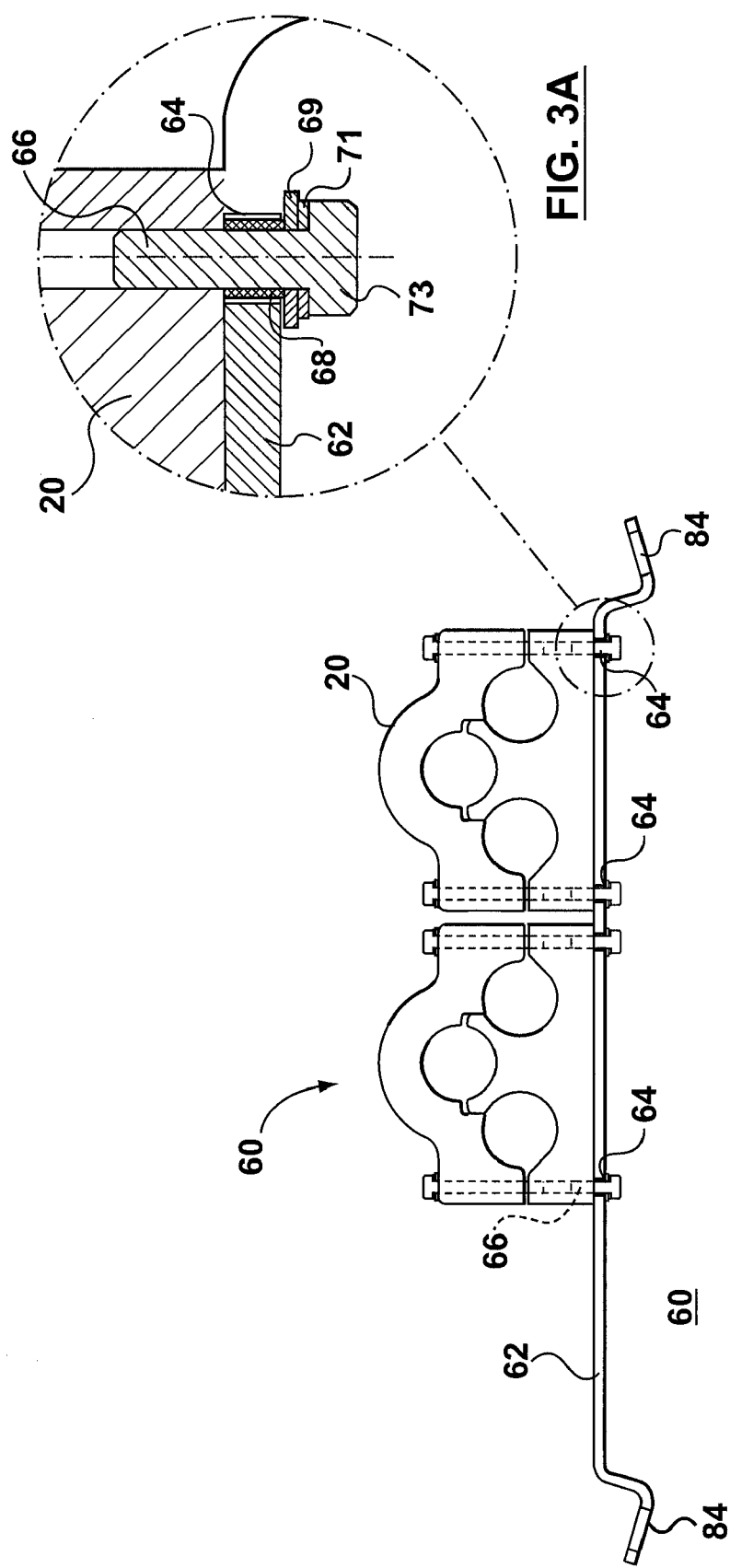

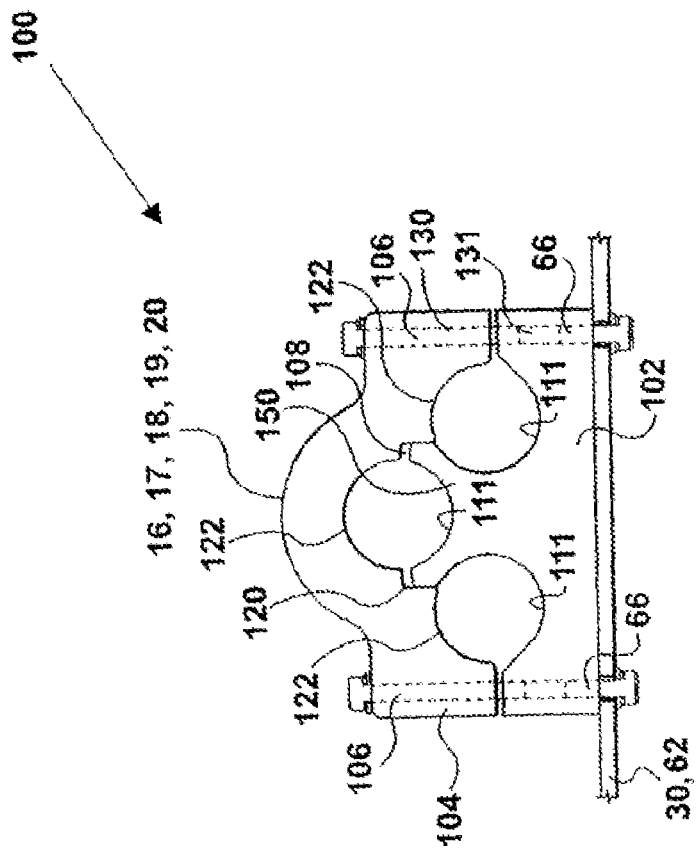
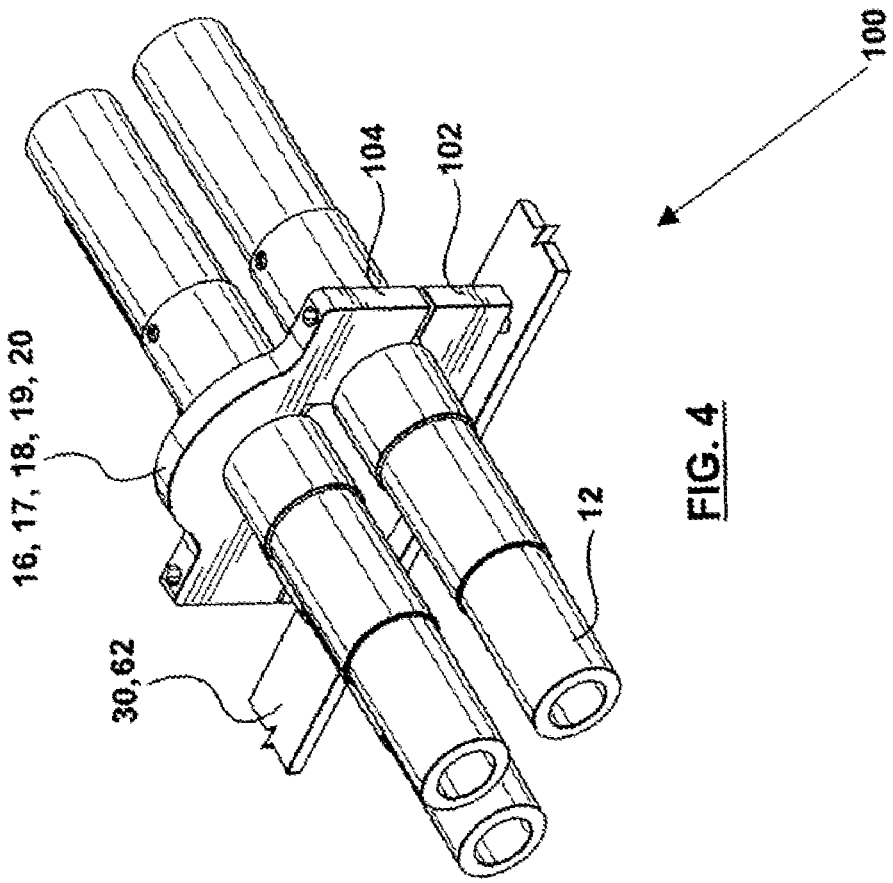

BUS BAR MOUNTING ARRANGEMENT

FIELD OF THE INVENTION

The present invention relates to a polyphase bus bar mounting structure suitable for use in wind turbine and other environments where the bus bar mounting structure is subjected to large amplitude vibration and movements in the support structure for the bus bar mounting structure.

BACKGROUND OF THE INVENTION

Currently, electrical power is supplied in most wind turbines by the use of cables. The cables are mounted on cable trays. However, due to movement of the tower support structure, which can be as much as four inches on a twenty foot section of tower, mechanical breakage of the cable tray supports has been observed.

The use of bus duct power delivery systems in wind turbine towers and in low amperage applications is not as economical as cables. Further the use of bus duct is not suitable for markets such as wind turbine towers because of the rigid nature of the bus duct and because the flat conductors of the bus duct generate excessive magnetic fields that require shielding.

Accordingly, there is a need to develop a bus bar system that is able to compete in price with cables, provide reliability in case of short circuit conditions, and operate in vibrational environments.

BRIEF DESCRIPTION OF THE INVENTION

The present invention relates to a polyphase bus bar mounting structure adapted for mounting to a support structure. The support structure may comprise any of a rack, wall or a segment of a wind turbine tower. The polyphase bus bar mounting comprises a plurality of cylindrical tubular conductors arranged substantially parallel to each other. Each of the tubular conductors comprises first and second opposing end portions adapted for connection with conductors of other polyphase bus bar mounting structures. Insulation surrounds each of the tubular conductors. The bus bar mounting structure further comprises first and second connectors. The first connector fixedly mounts the cylindrical tubular conductors, adjacent the first end portions, to the support structure. The second connector flexibly mounts the cylindrical tubular conductors, adjacent the second end portions, to the support structure.

The use of the tubular conductors are less expensive than flat bar conductors and have increased convection and radiation surface area increasing the amps per square inch of the material used for the tubular conductors. The tubular conductors provide for electrical conduction there along and preferably comprise a high conductivity aluminum alloy or copper.

The insulation surrounding the tubular conductors may be any suitable insulation such as for example insulation tapes wound about the conductors and is preferably an insulation tube slipped over the conductors. This tube may be shrunk fit to the conductor. The insulation provides for protection against electric shock allowing for the polyphase bus bar mounting structure of the present invention to be utilized as an open bus, where applicable.

By the bus bar mounting structure having one end portion of the tubular conductors fixedly connected to the support structure and the other end portion of the tubular conductors flexibly connected to the support structure, this permits the tubular conductors to move in a predetermined manner relative to the support structure. This relative movement reduces the risk of the polyphase bus bar mounting structure breaking from the support structure due to vibrations or other movement occurring in the support structure. For example, the present invention finds application in wind turbine towers made of multiple tower sections. These tower sections can be of lengths of twenty feet, for example. Relative movement of up to four inches over a twenty foot tower section may occur and the flexible connected end of the bus bar mounting structure in one tower support section is usually connected to the fixed connected end of another bus bar mounting structure in an adjacent tower support section. The flexible connection compensates for support structure movement and reduces the risk of breakage of the conductors from their support and from the support structure.

The first connector may comprise a first support in which the cylindrical tubular conductors are held substantially parallel to each other, and the second connector may comprise a second support in which the cylindrical tubular conductors are held substantially parallel to each other. These supports hold the position of the tubular conductors relative to each other and counter the effects of short circuit forces tending to move the cylindrical tubular conductors apart from each other.

In one embodiment the first connector further comprises a first bracket to which the first support is fixedly mounted. The first bracket has opposing legs fixedly mounted to the support structure. The second connector further comprises a second bracket to which the second support is flexibly mounted. The second bracket also has opposing legs mounted to the support structure.

In another embodiment, the polyphase bus bar mounting structure has threaded stem fasteners that pass into the first support and through the first bracket. Second threaded stem fasteners pass into the second support and through the second bracket. A resilient tube surrounds a portion of each of the second stem fasteners and passes through the second bracket to the second support. The second fasteners threadably engage the second support to secure the resilient tube relative to the second bracket and the second support.

In another embodiment, the second connector comprises a pair of universal springs each interconnecting the second support to the support structure. Preferably, the universal springs are U shaped springs each having one leg thereof connected with the second support and the other leg thereof connected with the support structure.

In another embodiment, the conductors are positioned in an equilateral triangular spatial relationship. This reduces the magnetic field effect of each of the phases of the cylindrical tubular conductors and eliminates the need for cross over connections between cylindrical tubular conductors of adjacent sections. In accordance with an aspect, there is provided a polyphase bus bar mounting structure for mounting to a support structure. The polyphase bus bar mounting structure comprises a plurality of cylindrical tubular conductors arranged substantially parallel to each other. Each of the tubular conductors comprises first and second opposing end portions adapted for connection with conductors of other polyphase bus bar mounting structures. Insulation surrounds each of the tubular conductors. The mounting structure comprises a connector for flexibly mounting the cylindrical tubular conductors to the support structure.

The present invention also relates to a clamping structure for supporting at least three cylindrical tubular conductors of a polyphase bus bar mounting structure arranged substantially parallel to each other and relative to a supporting structure. The clamping structure comprises a base member portion, a clamping member portion and a connection means. The base member portion is adapted to be mounted with the supporting structure. The base member portion comprises a first jaw face having at least three base arcuate cutout portions therein and into each one of which one of the conductors is positioned. The clamping member portion comprises a second jaw face portion having at least three arcuate member cutout portions therein that are adapted to align with the three base arcuate cutout portions and partially surround each of the conductors. The connecting means connects the clamping member portion to the base member portion to draw the clamping member portion towards the base member portion and secure the tubular conductors between the base member portion and the clamping member portion in the substantially parallel arrangement.

In one embodiment, the base member portion is fastened to a bracket that is mounted to a support structure.

BRIEF DESCRIPTION OF THE DRAWINGS

For a better understanding of the nature of the present invention reference may be had by way of example to the accompanying diagrammatic drawings in which:

FIG. 3 is an end view of a portion of the structure shown in FIG. 2;

FIG. 3A is an enlarged view of a portion of FIG. 3.

FIG. 4 is a perspective view of the clamping structure of the present invention; and, FIG. 5 is an end view of the clamping structure of the present invention.

DETAILED DESCRIPTION OF THE INVENTION

The present invention relates to a polyphase bus bar mounting structure suitable for use in environments where the bus bar mounting structure is subjected to large amplitude vibration and movements in the support structure for the bus bar mounting structure.

Figure 1:
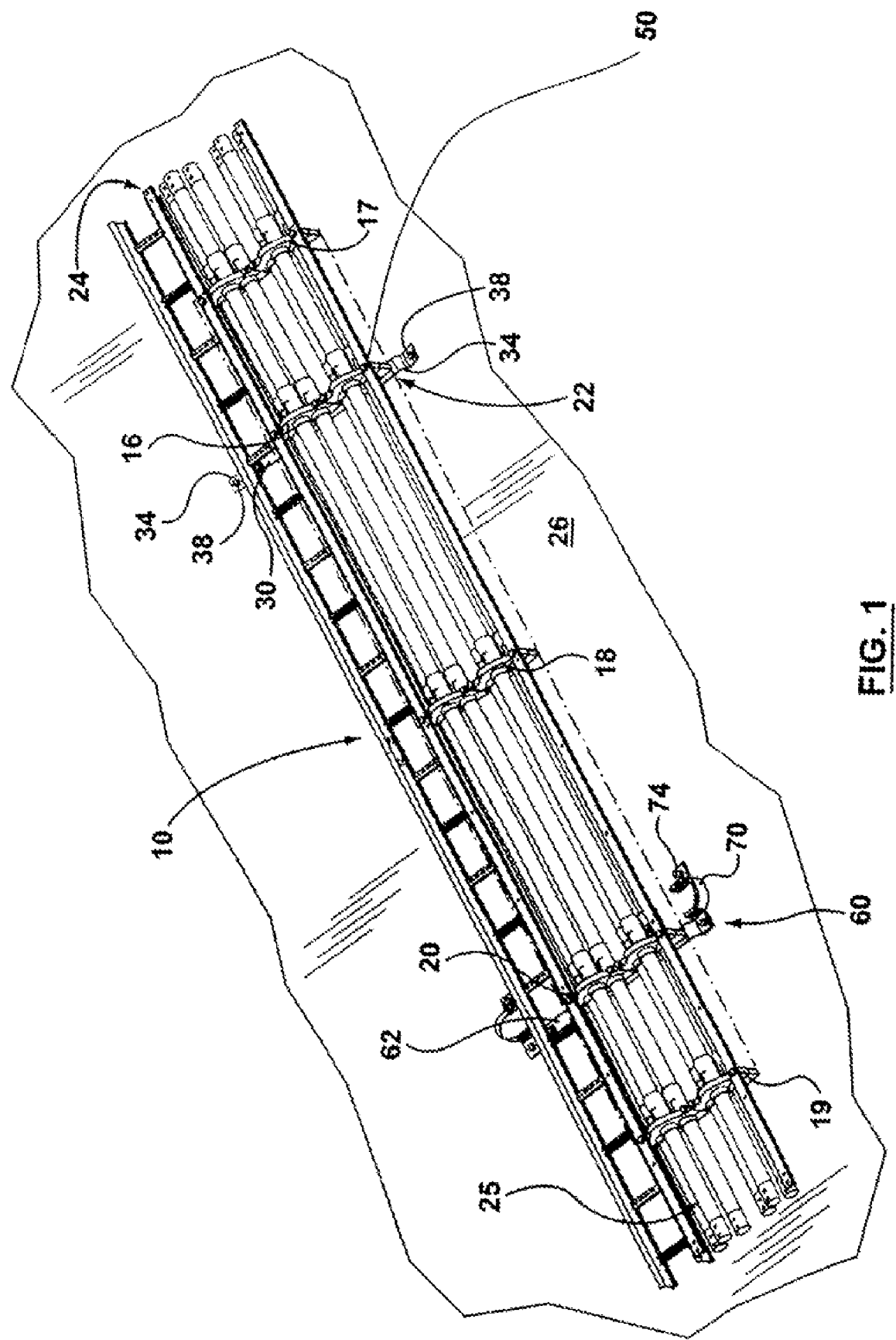
FIG. 1 is a perspective view of the polyphase bus bar mounting structure of the present invention.
Figure 2:
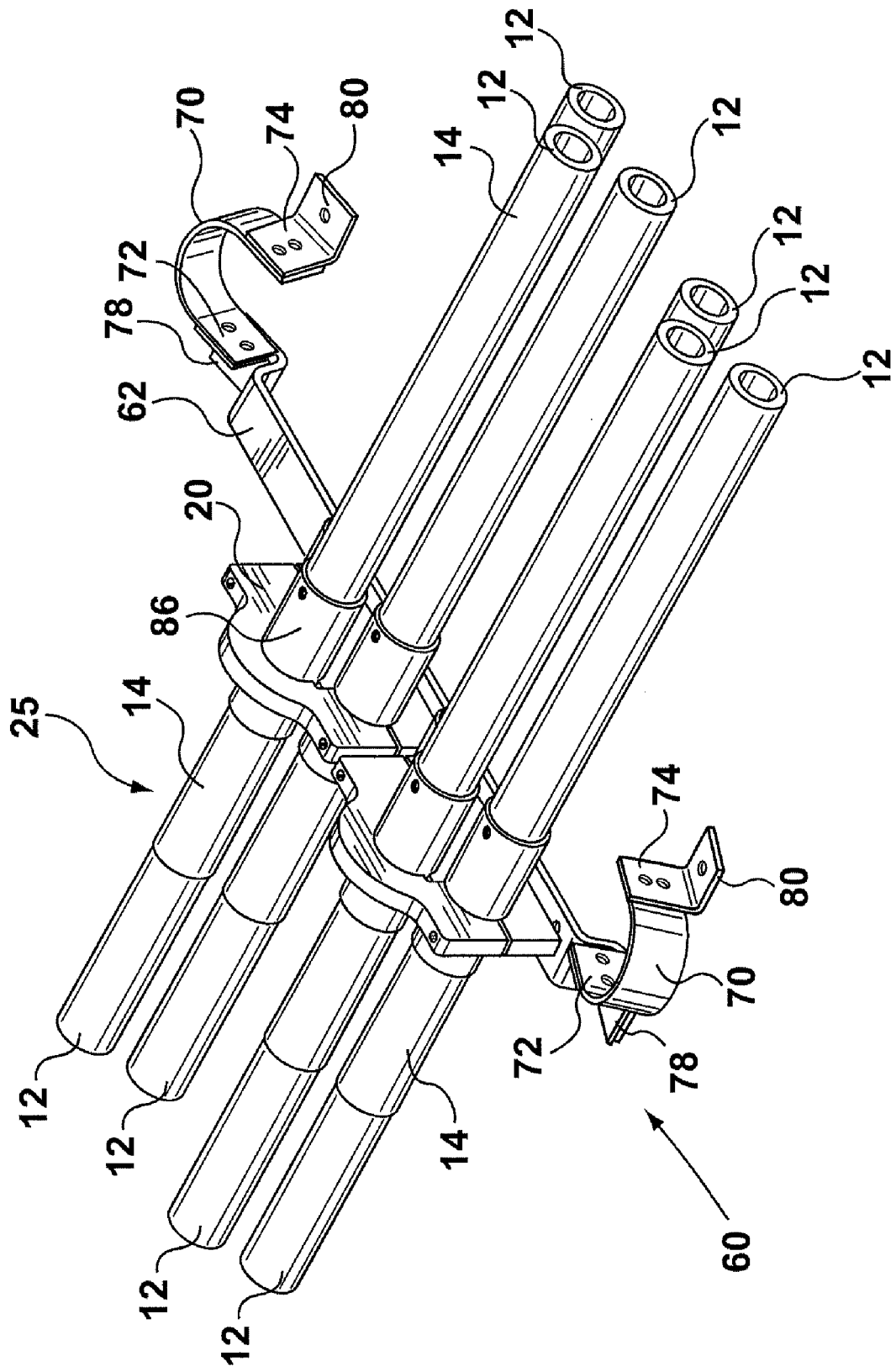
FIG. 2 is a perspective view showing the flexible connection of the bus bar mounting structure.

Referring to FIGS. 1 and 2, a polyphase bus bar mounting structure 10 suitable for transmitting power from a generator of a wind turbine is shown. The bus bar mounting structure 10 is shown to comprise two sets of three polyphase cylindrical tubular conductor 12 each arranged substantially parallel to each other in equilateral triangular spatial relationship. An insulation tube 14 surrounds each of the tubular conductors 12. It should be understood that two sets of three tubular conductors are shown to represent two polyphase busses running side by side. In alternative embodiments only one set of polyphase tubular conductors may be employed or more than two sets of polyphase tubular conductors may be used. The number of sets of conductors will depend on the application.

The tubular conductors 12 are held in the equilateral triangular spatial relationship by supports 16, 17, 18, 19 and 20. The support 16 forms part of a first connector 22 for fixedly mounting the tubular conductors 12 adjacent first end portions 24 of the tubular conductors 12 to support structure 26. The support structure 26 may comprise any of a rack, wall or a segment of a wind turbine tower.

The first connector 22 also comprises a first bracket 30 having apertures (not shown) through which threaded stem fasteners 50 pass. Fasteners 50 pass into and engage threaded slots in support 16. The bracket 30 has first opposing legs 34.

Legs 34 have apertures through which fasteners 38 pass to fixedly secure the first connector 22 in fixed relation with the support structure 26.

The center positioned support 18 and end supports 17 and 19 are floating supports in that they are not connected to the support structure 26. The supports 17, 18, and 20 are utilized in relatively long runs of conductors 12 to maintain the spatial relationship between each of the conductors 12.

As best seen in FIGS. 2, 3 and 3A, support 20 forms part of a second connector 60 that flexibly mounts the cylindrical tubular conductors 12 adjacent second end portions 25 to the support structure 26. The flexible connection is provided by two features which may be used individually to provide the flexible connection or in combination to provide the flexible connection.

The first feature providing the flexible connection is best seen in FIGS. 3 and 3A. The second bracket 62 has apertures 64 through which a second threaded stem fasteners 66 pass and pass into the second support 20. A resilient tube 68 passes through bracket apertures 64 and surrounds a portion of each of the second stem fasteners 66 adjacent the apertures 64 of the second bracket 62. The threaded stem fasteners 66 threadably engage the support 20 to secure resilient tube 68 relative to the second bracket 62 and the second support 20. The head 73 of fastener 66 engages lock nut 71 and washer 69 to lock the fastener 66 in place. It should be understood that the threaded fasteners may alternatively comprise stems that pass completely through the support and have threaded ends to which nuts are secured. In this alternative, the supports 20 do not require a threaded slot. The resilient tube 68 allows for play between the support 20 and the second bracket 62 of the second connector 60 thereby providing a flexible connection.

As best seen in FIG. 2, the second feature providing the flexible connection comprises a pair of universal springs in the form of two U shaped springs 70. Each of the U-shaped springs 70 has opposing legs 72 and 74. The opposing legs 72 and 74 have a connector piece 78 and 80 respectively. Connector piece 78 is connected by fasteners (not shown) through an aperture 84 in the second bracket 62. Connector piece 80 is connected by a suitable fastener (not shown) to the support structure 26. The universal springs 70 permits relative movement between the second bracket 62 of the second connector 60 and the support structure 26.

To further insulate the tubular conductors 12 from the supports 16, 18, and 20, the tubular conductors 12 are provided with an additional sleeve insulation 86 (see FIG. 2) that surrounds the tubular conductors 12 adjacent the supports 16, 17, 18, 19 and 20.

The supports 16, 17, 18, 19 and 20 are shown to support two sets of three cylindrical tubular conductors 12. Each of the supports 16, 17, 18, 19 and 20 is made in the form of a clamping structure 100 which is now described with reference to FIGS. 4 and 5. The supports 16, 17, 18, 19 and 20 are shown in this embodiment to support one set of three cylindrical tubular conductors 12. The purpose of the clamping structure 100, in the illustrated embodiment, is to positively locate and secure the cylindrical tube conductors 12 in the triangular spatial configuration shown. By maintaining the relative distance between the conductors 12, the conductors are prevented from movement in the event of short-circuit conditions. The clamping structure 100 comprises a base member portion 102, a clamping member portion 104 and connectors 106.

The base member portion 102 is adapted to be mounted with the support structure 26. In the embodiment shown, the base member portion 102 is connected to a corresponding bracket 30, 62 which in turn is respectively connected in either a fixed or flexible manner to the support structure 26. The base member portion 102 comprises a first jaw face 108 having three base arcuate cutout portions 111 therein and into each one of which one of the conductors 12 is positioned.

The clamping member portion 104 comprises a second jaw face portion 120 that has three arcuate cutout portions 122 therein that are adapted to align with the three base arcuate cutout portions 111 so as to partially surround each of the conductors 12. Fasteners 106 are threaded stem fasteners that pass through slots 130 in clamping member portion 104 and threadably engage threaded slots 131 in the base member portion 102. The fasteners 106 are tightened or turned to draw the clamping member portion 104 tight up against the base member portion 102 so as to sandwich the tubular conductors 12 therebetween. The cutout portion 111 of the first jaw face 108 provides a central raised pedestal 150 that spaces one of the cutout portions 111 from the two side cutout portions 111. The clamping member portion 104 has a more recessed center cutout portion 122 than its two adjacent cutout portions 122.

What is claimed is:

1. A polyphase bus bar mounting structure for mounting to a support structure, the polyphase bus bar mounting structure comprising:
    a plurality of cylindrical tubular conductors arranged substantially parallel to each other, each of the tubular conductors comprising first and second opposing end portions adapted for connection with conductors of other polyphase bus bar mounting structures;
    insulation surrounding each of the tubular conductors;
    a first connector for fixedly mounting the cylindrical tubular conductors, adjacent the first end portions thereof, to the support structure, the first connector comprising a first support in which the cylindrical tubular conductors are held substantially parallel to each other, and a first bracket to which the first support is fixedly mounted, the first bracket having opposing legs fixedly mounted to the support structure; and
    a second connector for flexibly mounting the cylindrical tubular conductors, adjacent the second end portions thereof, to the support structure, the second connector comprising a second support in which the cylindrical tubular conductors are held substantially parallel to each other, and a second bracket to which the second support is flexibly mounted, the second bracket having opposing legs mounted to the support structure.

2. The polyphase bus bar mounting structure of claim 1 further comprising first threaded stem fasteners passing through the first support and the first bracket, and further comprising second threaded stem fasteners passing through the second support and the second bracket, a resilient tube surrounding a portion of each one of the second stem fasteners and passing through the second bracket to the second support, and the second threaded stem fasteners securing the resilient tube relative to the second bracket and the second support.

3. The polyphase bus bar mounting structure of claim 2 further comprising universal springs each interconnecting a corresponding one of the opposing legs of the second bracket to the support structure.

4. The polyphase bus bar mounting structure of claim 3 wherein the universal springs comprise a pair of U shaped springs each having one leg thereof connected to the second bracket and another leg thereof connected to the support structure.

5. The polyphase bus bar mounting structure of claim 1 wherein the first and second supports each comprise:
    a base member portion adapted to be mounted to a corresponding one of the first and second brackets, the base member portion comprising a first jaw face having at least three base arcuate cutout portions therein and into each one of which one of the conductors is positioned;
    a clamping member portion comprising a second jaw face portion having at least three arcuate member cutout portions therein that are adapted to align with the three base arcuate cutout portions and partially surround a corresponding one of the conductors; and
    means connecting the clamping member portion to the base member portion to draw the clamping member portion towards the base member portion and to secure the tubular conductors between the base member portion and the clamping member portion in the substantially parallel arrangement.

6. The polyphase bus bar mounting structure of claim 2 wherein the first and second supports each comprise:
    a base member portion adapted to be mounted to a corresponding one of the first and second brackets, the base member portion comprising a first jaw face having three base arcuate cutout portions therein and into each one of which one of the conductors is positioned;
    a clamping member portion comprising a second jaw face portion having three arcuate member cutout portions therein that are adapted to align with the three base arcuate cutout portions and partially surround a corresponding one of the conductors; and wherein:
    the first and second stem fasteners connecting the clamping member portion to the base member portion to draw the clamping member portion towards the base member portion and to secure the tubular conductors between the base member portion and the clamping member portion in the substantially parallel arrangement.

7. The polyphase bus bar mounting structure of claim 1 wherein the second connector comprises universal springs interconnecting the second support to the support structure.

8. The polyphase bus bar mounting structure of claim 7 wherein the universal springs comprise a pair of U shaped springs each having one leg thereof connected to the second support and the other leg thereof connected to the support structure.

9. The polyphase bus bar mounting structure of claim 1 wherein the second connector comprises universal springs interconnecting the opposing legs of the second bracket to the support structure.

10. The polyphase bus bar mounting structure of claim 9 wherein the universal springs comprise a pair of U shaped springs each having one leg thereof connected to the second bracket and the other leg thereof connected to the support structure.

11. The polyphase bus bar mounting structure of claim 1 wherein the conductors are positioned in an equilateral triangular spatial relationship.

12. The polyphase bus bar mounting structure of claim 1 wherein the insulation of each of the conductors is surrounded by an insulating sleeve adjacent where the conductors are positioned within the first and second supports.

13. A polyphase bus bar mounting structure for mounting to a support structure, the polyphase bus bar mounting structure comprising:
    a plurality of cylindrical tubular conductors arranged substantially parallel to each other, each of the tubular conductors comprising first and second opposing end portions adapted for connection with conductors of other polyphase bus bar mounting structures;
    insulation surrounding each of the tubular conductors; and a connector for flexibly mounting the cylindrical tubular conductors to the support structure, the connector comprising a support in which the cylindrical tubular conductors are held substantially parallel to each other, and a bracket to which the support is flexibly mounted, the bracket having opposing legs mounted to the support structure.

14. The polyphase bus bar mounting structure of claim 13 further comprising threaded stem fasteners passing through the support and the bracket, a resilient tube surrounding a portion of each one of the stem fasteners and passing through the bracket to the support, and the threaded stem fasteners securing the resilient tube relative to the bracket and the support.

15. The polyphase bus bar mounting structure of claim 14 further comprising universal springs each interconnecting a corresponding one of the opposing legs of the bracket to the support structure.

16. The polyphase bus bar mounting structure of claim 15 wherein the universal springs comprise a pair of U shaped springs each having one leg thereof connected to the bracket and another other leg thereof connected to the support structure.

17. The polyphase bus bar mounting structure of claim 13 wherein the connector comprises universal springs interconnecting the support to the support structure.

18. The polyphase bus bar mounting structure of claim 17 wherein the universal springs comprise a pair of U shaped springs each having one leg thereof connected to the support and the other leg thereof connected to the support structure.

19. The polyphase bus bar mounting structure of claim 13 wherein the connector comprises universal springs interconnecting the opposing legs of the bracket to the support structure.

20. The polyphase bus bar mounting structure of claim 19 wherein the universal springs comprise a pair of U shaped springs each having one leg thereof connected to the bracket and the other leg thereof connected to the support structure.

* * * * *